Jan. 16, 1951  C. T. ZIMMERMANN  2,538,073
SLICING MACHINE SUBSTANCE CARRIAGE
Filed May 22, 1946  4 Sheets-Sheet 1
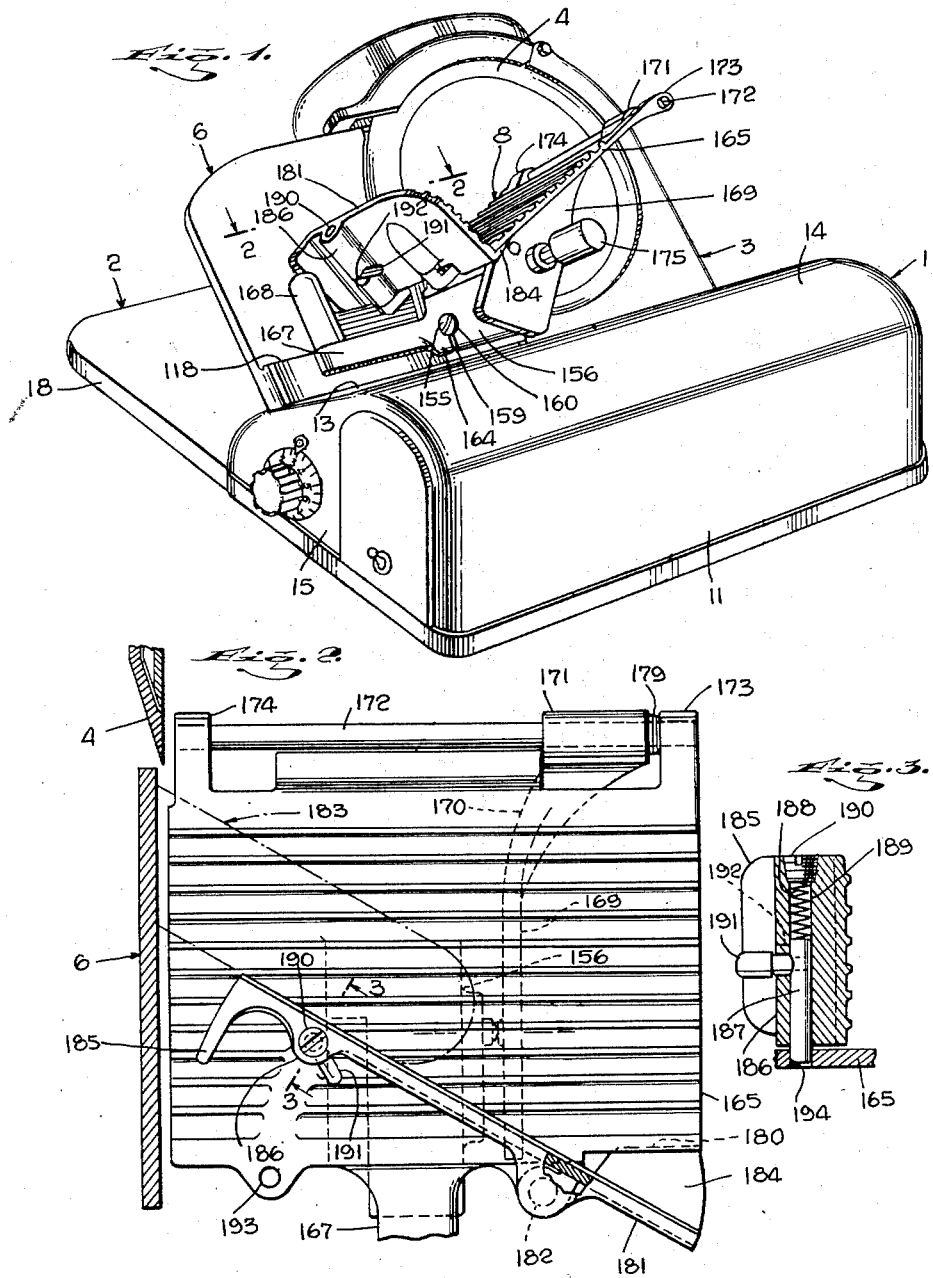
INVENTOR
CARL T. ZIMMERMAN
BY *Gusta Drews*
ATTORNEY

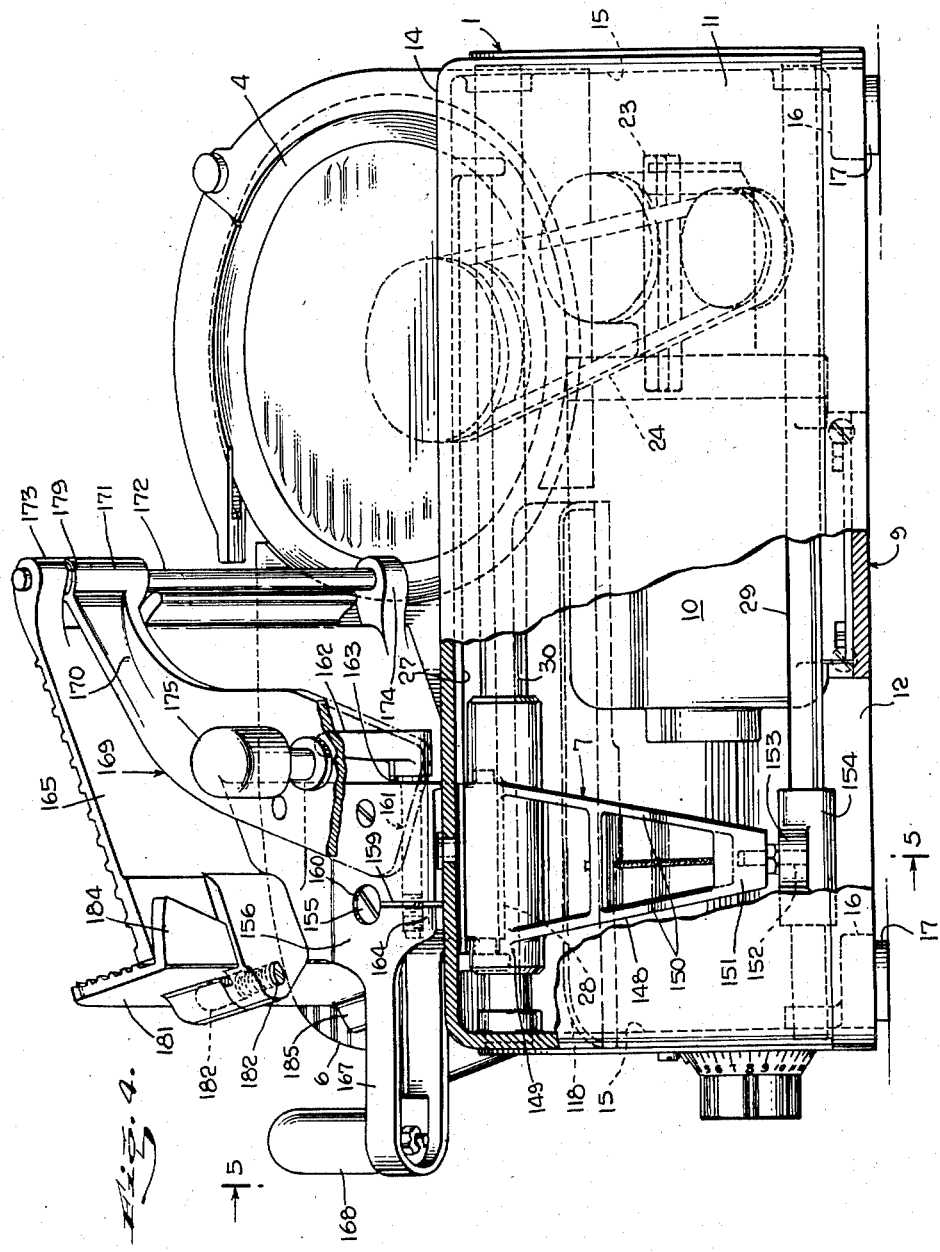

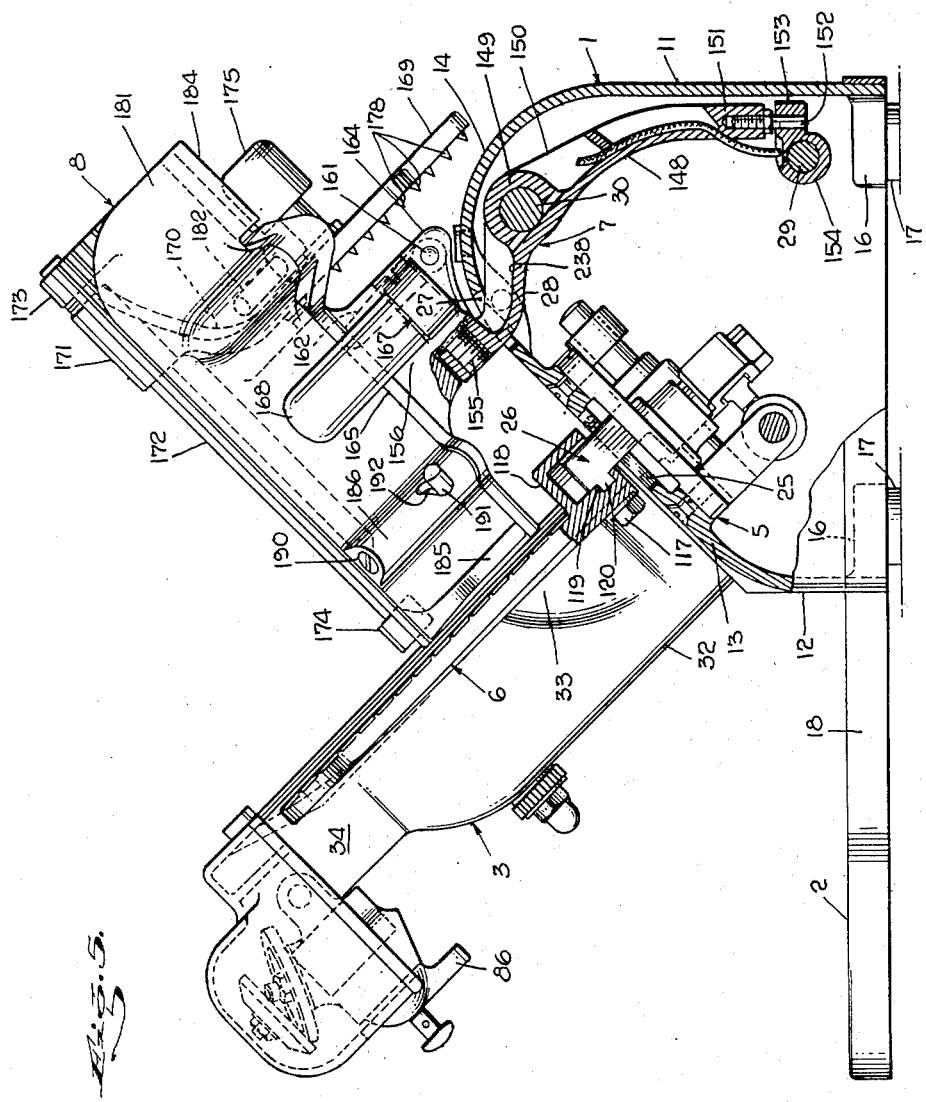

Jan. 16, 1951     C. T. ZIMMERMANN     2,538,073
SLICING MACHINE SUBSTANCE CARRIAGE
Filed May 22, 1946     4 Sheets-Sheet 4
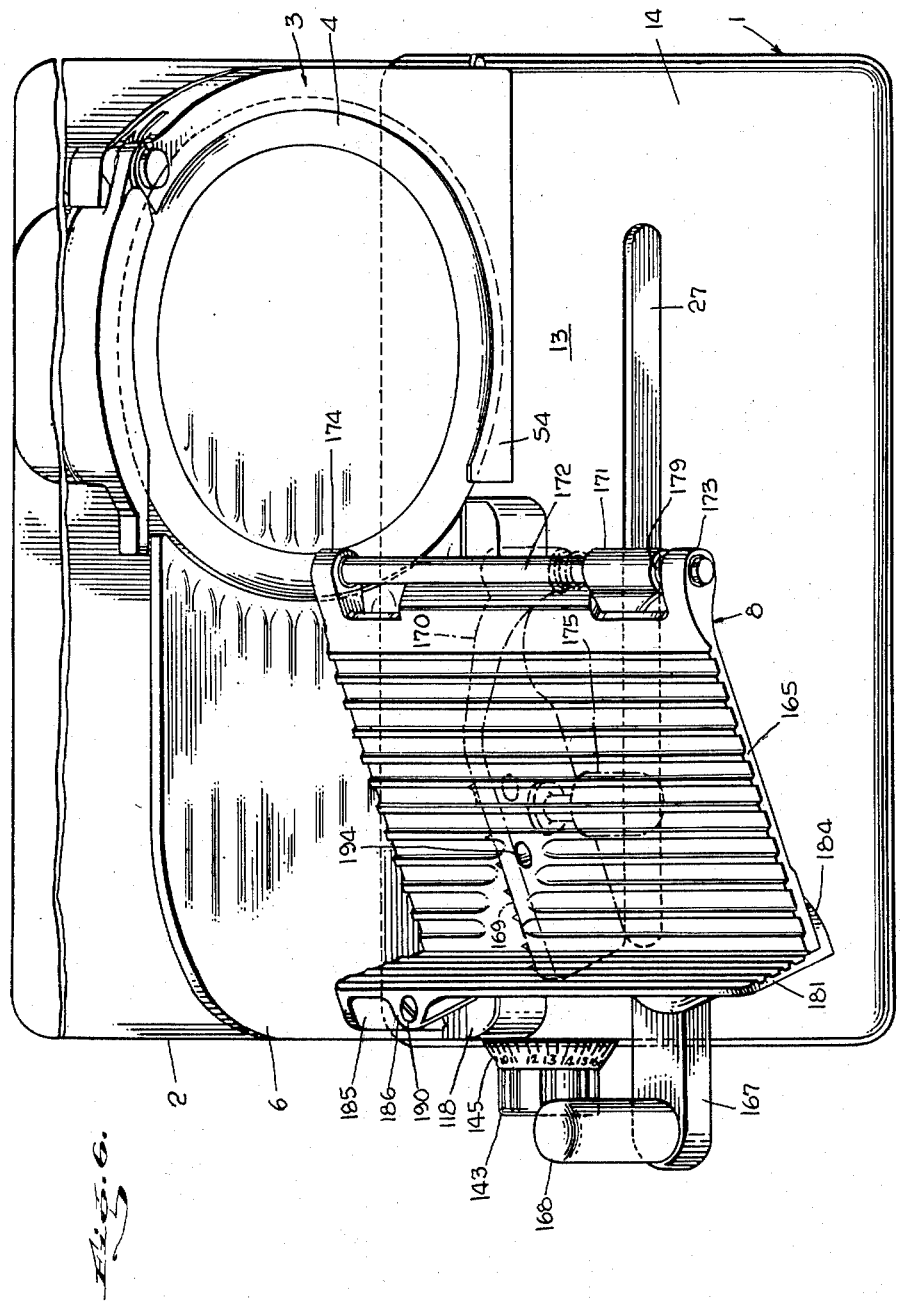
INVENTOR.
CARL T. ZIMMERMAN
BY Gusta Drews
ATTORNEY Patented Jan. 16, 1951

2,538,073

UNITED STATES PATENT OFFICE 2,538,073

SLICING MACHINE SUBSTANCE CARRIAGE

Carl T. Zimmermann, Old Greenwich, Conn., assignor to Globe Slicing Machine Co., Inc., Stamford, Conn., a corporation of New York Application May 22, 1946, Serial No. 671,468

2 Claims. (Cl. 146—102)

This invention relates to slicing machines in general and more especially to slicing machines of the gravity feed type in which the knife is disposed at an oblique angle to the vertical and the object holder, or chute, extends substantially vertical to the plane of the knife, and also at an oblique angle to the vertical to enable the article being cut automatically to descend by its own weight due to gravity as a slice is being cut from the lower end thereof.

Among the objects of the present invention it is aimed to provide an improved slicing machine of the gravity feed type having an article holder or meat holder which can be readily adjusted or converted to support an article, such as a bologna, while being sliced at various angles relative to the cutting plate, according to the desire of the customer.

These and other features, capabilities and advantages of the invention will appear from the subjoined detail description of specific embodiments thereof illustrated in the accompanying drawings, in which Fig. 1 is a perspective of the completed machine made according to one embodiment.

Fig. 2 is a section on the line 2—2 of Fig. 1, but with the adjustable plate inclined relative to the position shown in Fig. 1.

Fig. 3 is a section on the line 3—3 of Fig. 2.

Fig. 4 is an enlarged rear elevation with parts broken away.

Fig. 5 is an end elevation partly in section on the line 5—5 of Fig. 4.

Fig. 6 is a plan view with a part broken away on the scale shown in Fig. 5.

In the embodiment shown in Figs. 1 to 6, inclusive, there is illustrated a main housing 1, a platform 2, a knife supporting frame 3 for the knife 4, a supporting bracket 5 for the gauge plate 6, a hanger 7 for the substance or meat carrying chute 8, and a frame 9 for the motor 10.

The housing 1 consists essentially of a rear vertical wall 11, a short front vertical wall 12, a rearwardly inclined front wall 13 continuing upwardly from the front wall 12 and merging into the rounded upper wall portion 14 which in turn merges into the vertical rear wall 11. These walls 11, 12, 13 and 14 in the present instance, merge in the end walls 15.

The housing 1 is preferably open at the bottom to afford access to the interior of the housing 1 and is also provided with three openings formed in the inclined wall 13, one opening 23 to the left hand of the wall 13 to form a clearance for the belt 24 drivingly connected to the motor 10, a second opening 25, see Fig. 4, to accommodate the arm 26 of the gauge plate 6 to the right of the opening 23, and an extended opening 27 above the openings 23 and 25 to clear the arm 28 of the hanger 7. Adjacent the inner face of the lower end of the rear wall 11, there is fixed the lower guide rod 29 and slightly forward of the guide rod 29 and adjacent the inner face of the rounded wall portion 14 there is fixed the upper guide rod 30. The guide rods 29 and 30 are secured in the end walls 15.

The frame 3 is secured to the inclined wall 13 with the frame 3 surrounding the opening 23 for the belt 24, Fig. 4. The front wall 32 of the frame 3 merges into the end walls 33 of the frame 3 and into the diminished neck portion 34 at the outer end of the frame 3. Preferably the wall 32 extends at an angle of about 45° to the vertical.

The gauge plate 6, see Fig. 5, is secured by the bolt 117 to the arm 26 which extends through the opening 25. The gauge plate preferably has an angle plate 118 extending upwardly from the gauge plate 6 and rearwardly to cover the arm 26. This angle plate 118 preferably extends the full width of the gauge plate 6, and is rounded at its ends, Fig. 1, merging into the upper face of the plate 6. The plate 6 preferably has an elongated recess 119 to receive the projection 120 of the arm 26 to guide the plate 6 and to be adjusted laterally relative to the arm 26.

The hanger 7 shown in section in Fig. 4 mounted on the guide rods 29 and 30 consists essentially of a bracket 148 having a sleeve 149 slidably mounted on the guide rod 30, two diverging webs 150 terminating in the enlargement 151 in which is screw threadedly secured the pin 152 which is slidably mounted in the extension 153 on the sleeve 154 slidably mounted on the guide rod 29. The arm 28, see Fig. 4, extends forwardly and upwardly from the sleeve 149 and has screw threadedly secured thereto the post 155 to slidably receive the extension 156 of the chute. The extension 156, see Figs. 1 and 4, has a slot 159 therein in communication with the opening 160 for receiving the pin 155. Through this extension 156 extends the rod 161 having a lever 162 on the outer end thereof and a shoulder 163 engaging the outer face of the extension 156. The inner end of the rod 161 is screw threadedly connected to the portion 164 of the extension 156 so that when the lever 162 is turned it will cause the two portions of the extension 156 to either side of the slot 159 acting as jaws to approach one another and securely engage the pin 155. Here again, without the use of tools but merely by the movement of the lever 162 the chute can be removed since the chute now to be explained is formed on the extension 156.

The extension 156 in the present instance is formed on the rear of the substance carrying plate 165 which in the present instance constitutes the main support for the substance to be moved to and from the cutting edge of the knife 4. The plate 165 preferably extends vertically to the plane of the knife 4 and its lower edge ordinarily is disposed fairly close to the cutting edge of the knife 4.

In the present instance, the extension 156 has extending therefrom the arm 167 on which is formed the handle 168 for engagement by the operator to move the chute to and from the cutting edge of the knife. On one end of the plate 165 there is preferably hingedly supported the end weight 169 such as disclosed in United States Patent No. 2,085,519. This end weight 169 preferably has an arm 170 having a sleeve 171 slidably mounted on the rod 172 secured in the enlargements 173 and 174 at the upper and lower ends of the free end of the plate 165. Preferably the end weight 169 has a handle 175 extending therefrom in order to lift the end weight 169 and swing it either to the front of the plate 165 into engagement with the substance to be sliced, or rearward into position shown in Fig. 1 where it is resiliently anchored.

The lower face of the end weight 169 preferably has pins or projections 178 formed thereon to engage the substance to be cut.

The spring 179 acts as a snubber or cushion to take up the shock when the arm 170 is moved upwardly.

In the embodiment shown in Figs. 1, 3, 5 and 6, the plate 165 constitutes one wing of the chute, and the plate 181 constitutes the other wing which in this embodiment is movable relative to the plate 165. Although the plate 181 is substantially vertical to the plate 165 at all times, and the plate 165 is substantially vertical to the plane of the knife 4 at all times, the plate 181, see Figs. 2 and 4, is pivotally mounted on the pin 182 so that it can be swung from a position at right angles to the plane of the blade to an inclined position forming an angle of about 60° with the plane of the knife 4. When the plate 181 is so tilted, see Fig. 2, it is particularly adapted for slicing small articles of food, such as bologna and the like at an angle to the axis of the bologna in accordance with the practice. In Fig. 2 the dash and dot line 183 is there illustrative of the outline of a piece of bologna, when supported by the plates 165 and 181 and when the plate 181 is inclined relative to the plane of the knife 4. This pivot pin 182 in the present instance is positioned about one-third of the height of the plate 165 from its upper outer free end. When so positioned, the lower end of the plate 181 will clear the gauge plate 6, but effectively cooperate with the plate 165 to support the piece of bologna 183 at the desired inclination to engage the cutting edge of the knife 4. The upper end of the plate 181 may have a flange 184 extending at right angles thereto and in alinement with the rear face of the plate 165. This flange 184 will cooperate with the plate 181 properly to support the substances being cut when the plate 181 is swung into the inclined position as shown in Fig. 2.

Preferably to protect the hand of the operator, when the plate 181 is tilted as aforesaid, the lower end of the plate 181 is provided with a finger piece 185 so that when the attendant is operating the machine he may with his right hand engage the plate 181 to move the chute to and from the cutting edge of the knife 4 and position the thumb of his right hand in the finger or thumb piece 185 to leave free the other four fingers of his right hand to engage the substance being cut, such as the bologna 183. In this way, the finger piece 185 serves as a guide to the operator so that he will not bring his fingers down low enough to touch the cutting edge of the knife 4.

Above the finger piece 185 in the present instance, there is formed an enlargement or boss 186, see Fig. 3, in which is slidably mounted the pin 187 extending from one end of the enlargement 186, as shown in Fig. 3 and engaging the spring 188 at its other end, which spring 188 is disposed in the opening 189 between the inner end of the pin 187 and the closure 190 to exercise a yieldable urge on the pin 187 in a downward direction. To the pin 187 there is secured the projection 191 which extends outward through the cammed slot 192, see Figs. 1 and 5. The pin 187 when extended may enter either the recess 193, Fig. 2, or the recess 194, Fig. 6. When the pin 187 is disposed in the recess 193, it will be locked in the position shown in Fig. 6, and in turn when it is disposed in the opening 194 it will be locked in the position shown in Fig. 2. The cam slot 192 enables the projection 191 by a rotating motion to move the pin 187 into and out of extended position against the tension of the spring 188.

While the position of the pin 182 of the plate 181 has certain advantages, obviously this pivot pin may be disposed near to the gauge plate 6 when the lower end of the plate 181 will not be spaced from the gauge plate 6 as far as it is in the present instance when swung into the inclined position shown in Fig. 2. Still furthermore, the distance that the pin 182 may be spaced from the gauge plate 6 may be varied without departing from the general spirit of the invention.

The plate 181 is removably mounted on the pin 182 but cannot be removed from the plate 165 unless the flange 184 clears the lower face of the plate 165. It will appear that the flange 184 as shown at 180 will still overlap the lower face of the plate 165 when the pin 187 is disposed in the recess 194. In other words, when the operator wishes to actuate the plate 181 from the position shown in Figs. 1 and 6 to that shown in Fig. 2, he will first engage the projection 191 to raise the pin 187 against the tension of the spring 188, and then swing the plate 181 over toward the recess 194. If he should release the projection 191 in the meantime, the spring 188 will automatically cause the pin 187 to enter the recess 194 and prevent the plate 181 from swinging further over across the plate 165. In turn, however, when it is desired to remove the plate 181 entirely, a definite and independent force must be exercised to engage the projection 191 in turn to raise the pin 187 and hold it in raised position until the plate 181 moves beyond the recess 194, a distance sufficient to permit the overlapping portion 180 to clear the plate 181. Only then may the plate 181 be removed from the plate 165.

It is obvious that various changes and modifications may be made to the details of construction without departing from the general spirit of the invention as set forth in the appended claims.

I claim:

1. A substance carrier for a slicing machine having a rotatable knife and a gauge plate substantially parallel to one another and forming an obtuse angle with the horizontal, the substance carrier mounted on a support which is slidable across the upper face of said gauge plate to and from said knife, characterized by a fixed wing plate and a movable and removable wing plate, said fixed wing plate being fixed to the support and always extending substantially normal to the plane of the gauge plate, a pivot pin on said fixed wing plate near the outer edge thereof at a point intermediate the lower and upper ends of said fixed wing plate, said movable wing plate pivotally mounted on said pivot pin always to form a right-angular dihedral angle with said fixed wing plate, the front faces of said wing plates constituting the substance supporting faces and always forming an obtuse angle with the horizontal, a thumb piece extending rearwardly from the lower end, and a flange extending forwardly from the upper end of said movable wing plate, said flange being parallel to and riding adjacent to, and under, said fixed wing plate, there being recesses in the front supporting face of said fixed wing plate adjacent the path of movement of the adjacent edge of said movable wing plate, and a spring-pressed pin movably supported on said movable wing plate to enter one of said recesses to position the front face of said movable wing plate substantially normal to the gauge plate and to enter the other of said recesses to enable the front face of said movable wing plate to form an obtuse angle with the gauge plate where a portion of said flange will still be positioned under said fixed wing plate and thereby anchor it against accidental removal, the movable wing plate being movable beyond said other recess when said spring-pressed pin is actuated to a point where said flange clears said fixed wing plate when it is desired to remove the movable wing plate.

2. A substance carrier of the character set forth in claim 1 having a chambered boss disposed adjacent to, and immediately above, said thumb piece to slidably house said spring-pressed pin, there being a slot in said boss, and a control projection secured to said spring-pressed pin and extending through said slot adjacent to said thumb piece to facilitate actuation of said projection while actuating said thumb piece.

CARL T. ZIMMERMANN.

REFERENCES CITED

The following references are of record in the file of this patent:

UNITED STATES PATENTS

| Number | Name | Date |
|---|---|---|
| 897,018 | Roest | Aug. 25, 1908 |
| 1,480,572 | Silvertsen | Jan. 15, 1924 |
| 1,878,207 | Van Weenen | Sept. 20, 1932 |
| 1,906,743 | Fitzpatrick | May 2, 1933 |
| 1,939,740 | Van Berkel | Dec. 19, 1933 |
| 1,948,811 | Van Berkel | Feb. 11, 1934 |
| 1,960,422 | Van Berkel | May 29, 1934 |
| 2,008,822 | Freudenberg | July 23, 1935 |
| 2,167,015 | Waage | July 25, 1939 |
| 2,237,047 | Brookhart et al. | Apr. 1, 1941 |
| 2,333,636 | Brustowsky | Nov. 9, 1943 |
| 2,355,354 | Wood | Aug. 8, 1944 |
| 2,355,487 | Van Berkel | Aug. 8, 1944 |
| 2,378,664 | Thomas | June 19, 1945 |
| 2,400,279 | Wood | May 14, 1946 |
| 2,402,520 | Wood | June 18, 1946 |
| 2,410,698 | Wood | Nov. 5, 1946 |

FOREIGN PATENTS

| Number | Country | Date |
|---|---|---|
| 627,871 | Germany | July 24, 1936 |
| 536,824 | Great Britain | May 28, 1941 |